US008923021B2

(12) United States Patent
Ren et al.

(10) Patent No.: US 8,923,021 B2
(45) Date of Patent: Dec. 30, 2014

(54) CONTROL CIRCUIT AND SYSTEM FOR SWITCH MODE POWER SUPPLY

(75) Inventors: Xuegang Ren, Shanghai (CN); Jianhua Duan, Shanghai (CN); Siyuan Xu, Shanghai (CN); Na Liu, Shanghai (CN); Zeqiang Chen, Shanghai (CN)

(73) Assignee: BCD Semiconductor Manufacturing Co., Ltd., Shanghai (CN)

( * ) Notice: Subject to any disclaimer, the term of this patent is extended or adjusted under 35 U.S.C. 154(b) by 191 days.

(21) Appl. No.: 13/338,857

(22) Filed: Dec. 28, 2011

(65) Prior Publication Data

US 2013/0148387 A1 Jun. 13, 2013

(30) Foreign Application Priority Data

Dec. 9, 2011 (CN) .......................... 2011 1 0409130

(51) Int. Cl.
*H02M 3/335* (2006.01)

(52) U.S. Cl.
USPC .................................... 363/21.12; 363/21.16

(58) Field of Classification Search
USPC ............. 363/16, 17, 20, 21.07, 21.08, 21.12, 363/21.13, 21, 15, 21.16, 49, 56.01, 74; 323/211, 222, 282–289, 235, 242, 312
See application file for complete search history.

(56) References Cited

U.S. PATENT DOCUMENTS

| | | | |
|---|---|---|---|
| 5,029,269 A * | 7/1991 | Elliott et al. ................. | 363/21.1 |
| 5,452,195 A | 9/1995 | Lehr et al. | |
| 5,640,317 A * | 6/1997 | Lei .................................. | 363/49 |
| 6,404,654 B1 | 6/2002 | Wang | |
| 6,674,271 B2 | 1/2004 | Chao et al. | |
| 6,943,535 B1 | 9/2005 | Schiff | |
| 6,980,442 B2 | 12/2005 | Lv et al. | |
| 7,113,413 B1 * | 9/2006 | Khasiev ..................... | 363/21.14 |
| 7,313,004 B1 | 12/2007 | Yang et al. | |
| 7,518,836 B2 * | 4/2009 | Kim et al. ........................ | 361/18 |
| 7,579,784 B2 * | 8/2009 | Araki et al. ............... | 315/209 R |
| 7,961,483 B2 * | 6/2011 | Huynh et al. .............. | 363/21.12 |
| 8,125,799 B2 * | 2/2012 | Zhu et al. ................... | 363/21.14 |
| 8,213,203 B2 * | 7/2012 | Fei et al. ........................ | 363/131 |
| 2001/0004204 A1 | 6/2001 | Mitsuaki | |
| 2003/0169606 A1 | 9/2003 | Miermans | |
| 2003/0183924 A1 | 10/2003 | Bhalla et al. | |

(Continued)

OTHER PUBLICATIONS

Non-Final Office Action for U.S. Appl. No. 12/136,760, mailed on Apr. 26, 2012, 12 pages.

(Continued)

*Primary Examiner* — Rajnikant Patel

(57) ABSTRACT

A switch-mode power supply (SMPS) includes a transformer having a primary winding coupled to a power switch, a secondary winding for providing an output of the power supply, and a controller. The controller includes a first input terminal for receiving a current sensing signal related to a current in the primary winding, a second input terminal for receiving a feedback signal related to a current in the secondary winding, and an output terminal for providing a control signal to turn on and off the power switch. When the feedback signal is higher than a first reference voltage, the controller is configured to cause the SMPS to maintain a constant output current at a first current magnitude. When the feedback signal is lower than the first reference voltage, the controller is configured to cause the SMPS to provide a second output current at a second current magnitude higher than the first current magnitude.

20 Claims, 7 Drawing Sheets

(56) References Cited

U.S. PATENT DOCUMENTS

| | | |
|---|---|---|
| 2005/0212501 A1 | 9/2005 | Acatrinei |
| 2007/0121258 A1 | 5/2007 | Hachiya |
| 2007/0210772 A1 | 9/2007 | Sawtell |
| 2008/0310191 A1 | 12/2008 | Zhu et al. |

OTHER PUBLICATIONS

Chen et al., "Reduction of Power Supply EMI Emission by Switching Frequency Modulation," IEEE Power Electronics and Drive System Conference 1993; pp. 127-133.

Non-Final Office Action for U.S. Appl. No. 12/136,760, mailed on Aug. 4, 2011, 24 pages.

Non-Final Office Action for U.S. Appl. No. 12/248,665, mailed on Aug. 19, 2011, 13 pages.

Notice of Allowance for U.S. Appl. No. 12/620,420, mailed on Feb. 8, 2012, 8 pages.

Notice of Allowance for U.S. Appl. No. 12/605,081, mailed on Oct. 19, 2011, 9 pages.

Stankovich et al., "Analysis and Synthesis of Randomized Modulation Schemes for Power Converters," IEEE Transactions of Power Electronics, vol. 10, No. 6, Nov. 1995, pp. 680-693.

\* cited by examiner

CONTROL CIRCUIT AND SYSTEM FOR SWITCH MODE POWER SUPPLY

CROSS-REFERENCES TO RELATED APPLICATIONS

This application claims priority to Chinese Patent Application No. 201110409130.7, filed Dec. 9, 2011, which is commonly owned and incorporated by reference in its entirety herein for all purposes. This application is also related to U.S. patent application Ser. No. 12/620,420, filed Nov. 17, 2009, which is commonly owned and incorporated by reference herein in its entirety herein for all purposes.

BACKGROUND OF THE INVENTION

Embodiments of the present invention are directed to power supply control circuits and power supply systems. More particularly, embodiments of the invention provide methods and circuits for controlling an output current in a switched mode power supply (SMPS).

Regulated power supplies are indispensable in modern electronics. For example, the power supply in a personal computer often needs to receive power input from various outlets. Desktop and laptop computers often have regulated power supplies on the motherboard to supply power to the CPU, memories, and periphery circuitry. Regulated power supplies are also used in a wide variety of applications, such as home appliances, automobiles, and portable chargers for mobile electronic devices, etc.

In general, a power supply can be regulated using a linear regulator or a switching mode controller. A linear regulator maintains the desired output voltage by dissipating excess power. In contrast, a switching mode controller rapidly switches a power transistor on and off with a variable duty cycle or variable frequency and provides an average output that is the desired output voltage.

Compared with linear regulators, switching mode power supplies have the advantages of smaller size, higher efficiency and larger output power capability. Pulse Width Modulation (PWM) and Pulse Frequency Modulation (PFM) are two control architectures of switching mode power supplies. In recent years, green power supplies are emphasized, which require higher conversion efficiency and lower standby power consumption. In a PWM controlled switching mode power supply, the system can be forced to enter into burst mode in standby conditions to reduce power consumption. In a PFM controlled switching mode power supply, the switching frequency can be reduced in light load conditions. PFM-controlled switching mode power supply exhibits simple control topology and small quiescent current. Therefore, it is suitable for low cost small output power applications such as battery chargers and adapters.

In a switched mode power supply system, a switch is connected to the primary winding of the transformer. Magnetic energy is stored in the inductance of the primary winding when the switch is turned on, and the energy is transferred to the secondary winding when the switch is turned off. The energy transfer results in a current flowing through the secondary winding and the rectifying diode. The SMPS often operates in a constant-voltage mode or a constant-current mode. However, during start up, the constant-current mode can limit the output current and lead to long start up time.

Therefore, there is a need for techniques that can provide more precise control of output current-voltage characteristics in a power supply.

BRIEF SUMMARY OF THE INVENTION

Embodiments of the present invention are directed to power supply control circuits and power supply systems. More particularly, embodiments of the invention provide methods and circuits for controlling an output current in a switched mode power supply (SMPS). Merely by way of example, some embodiments of the invention have been applied to an SMPS controller such that the output current is increased during start up. But it would be recognized that the invention has a much broader range of applicability.

According to some embodiments of the invention, a controller is provided for a switched mode power supply (SMPS). The SMPS includes a transformer having a primary winding coupled to a power switch and a secondary winding for providing an output of the power supply. The controller includes a first input terminal for receiving a current sensing signal which is related to a current in the primary winding, a second input terminal for receiving a feedback signal related to a current in the secondary winding, and an output terminal for providing a power switch control signal to turn on and off the power switch. When the feedback signal is higher than a first reference voltage, the controller is configured to cause the SMPS to maintain a constant output current at a first current magnitude. When the feedback signal is lower than the first reference voltage, the controller is configured to cause the SMPS to provide a second output current at a second current magnitude higher than the first current magnitude. In a specific embodiment, when the feedback signal is higher than a second reference voltage that is higher than the first reference voltage, the controller is configured to cause the SMPS to maintain a constant output voltage. In some applications, the controller can be used to cause the power supply to provide a maximum output current at start up.

According to another embodiment, a controller is provided for a switched mode power supply (SMPS). The SMPS includes a transformer having a primary winding coupled to a power switch and a secondary winding for providing an output of the power supply. The controller includes a first input terminal for receiving a current sensing signal which is related to a current in the primary winding, a second input terminal for receiving a feedback signal related to a current in the secondary winding, and an output terminal for providing a power switch control signal to turn on and off the power switch. When the feedback signal is higher than a first reference voltage and lower than a second reference voltage, the controller is configured to cause the SMPS to maintain a constant output current at a first current magnitude. When the feedback signal is lower than the first reference voltage, the controller is configured to cause the SMPS to provide a second output current at a second current magnitude higher than the first current magnitude. When the feedback signal is higher than the second reference voltage that is higher than the first reference voltage, the controller is configured to cause the SMPS to maintain a constant output voltage.

In some embodiments, the controller described above can have a secondary conduction detection circuit configured to receive the feedback signal from the second input terminal and to generate a secondary conduction time signal, which is raised to a high value when a current is flowing in the secondary winding. In some embodiments, the controller can also includes a constant-current control circuit configured to receive the secondary conduction time signal and to produce a constant current control signal that causes the power switch control signal to be activated at fixed intervals. In some embodiments, the constant-current control circuit has a first capacitor configured to be charged with a source current through a source current switch and discharged with a sink current through a sink current switch and a comparator coupled to the first capacitor and configured to produce the constant current control signal.

In some embodiments, the controller also has a critical conduction control circuit that is configured to trigger the power switch control signal to turn on the power switch on a falling edge of the secondary conduction time signal when the feedback signal is lower than the first reference voltage. In some embodiments, the critical conduction control circuit includes a comparator configured to receive the feedback signal and the first reference voltage. The comparator is enabled by the secondary conduction time signal. The critical conduction control circuit also has a flip-flop coupled to the comparator and a D-trigger circuit coupled to the flip-flop through one or more logic gates.

In some embodiments, the controller also includes a constant-voltage control circuit that is configured to trigger the power switch control signal when the feedback signal falls below a target output voltage. In some embodiments, the controller can also have an off time control circuit configured to deactivate the power switch control signal when the current sense signal reaches a preset value.

According to alternative embodiments of the invention, a switched mode power supply (SMPS) includes a primary winding, a power switch coupled to the primary winding, a secondary winding for providing an output of the power supply, and a controller coupled to the power switch. The controller has a first input terminal for receiving a current sensing signal which is related to a current in the primary winding, a second input terminal for receiving a feedback signal related to a current in the secondary winding, and an output terminal for providing a power switch control signal to turn on and off the power switch. When the feedback signal is higher than a first reference voltage, the controller is configured to cause the SMPS to maintain a constant current at a first current. When the feedback signal is lower than the first reference voltage, the controller is configured to cause the SMPS to provide a second current that is higher than the first current.

Various additional features and advantages of the present invention can be further appreciated with reference to the detailed description and accompanying drawings that follow.

DETAILED DESCRIPTION OF THE INVENTION

The description below is presented with reference to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
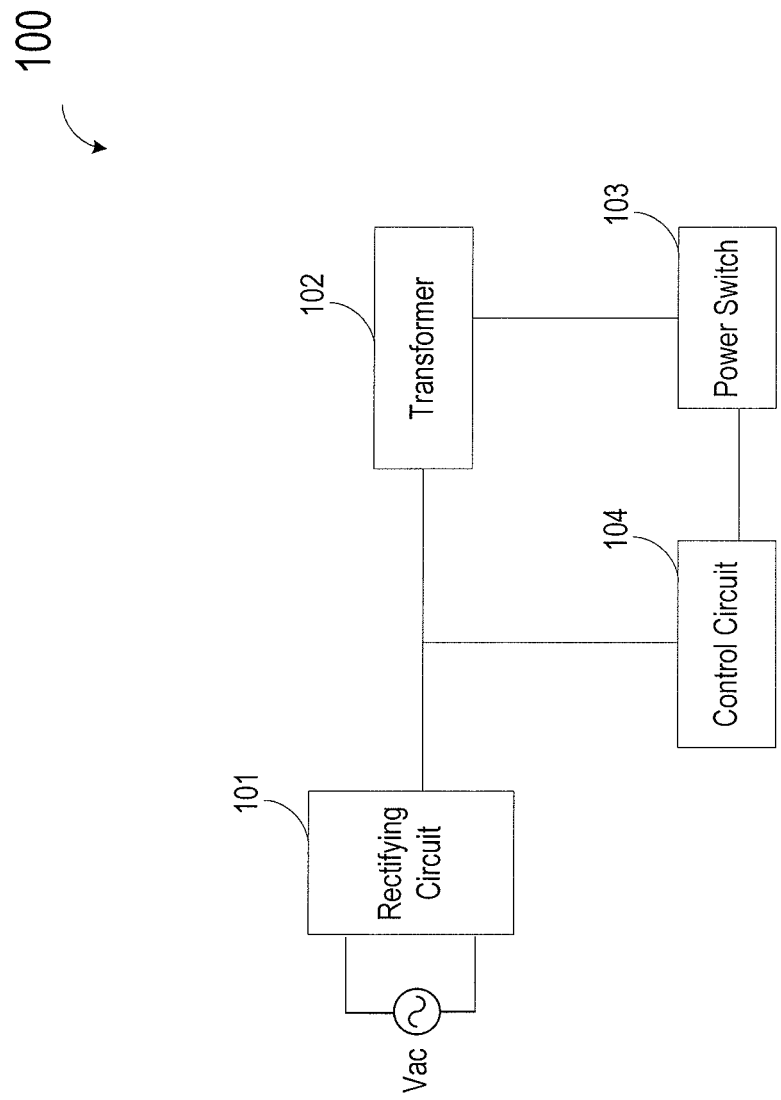
FIG. 1 is a simplified block diagram illustrating a switch-mode power supply (SMPS) according to an embodiment of the present invention.

FIG. 1 is a simplified block diagram illustrating a switch-mode power supply (SMPS) 100 according to an embodiment of the present invention. As shown, power supply 100 includes a rectifying circuit 101 coupled to an input alternate current (AC) voltage source, a transformer 102. The primary winding is coupled to rectifying circuit 101. Power supply 100 also includes a power switch 103 couple to the transformer, and a control circuit 104 coupled to power switch 103 for controlling the current in the primary winding such that the power supply can output a constant output current. Note that a transformer is included in this power supply, but a different inductance based coupling circuit can also be used.

Figure 2:
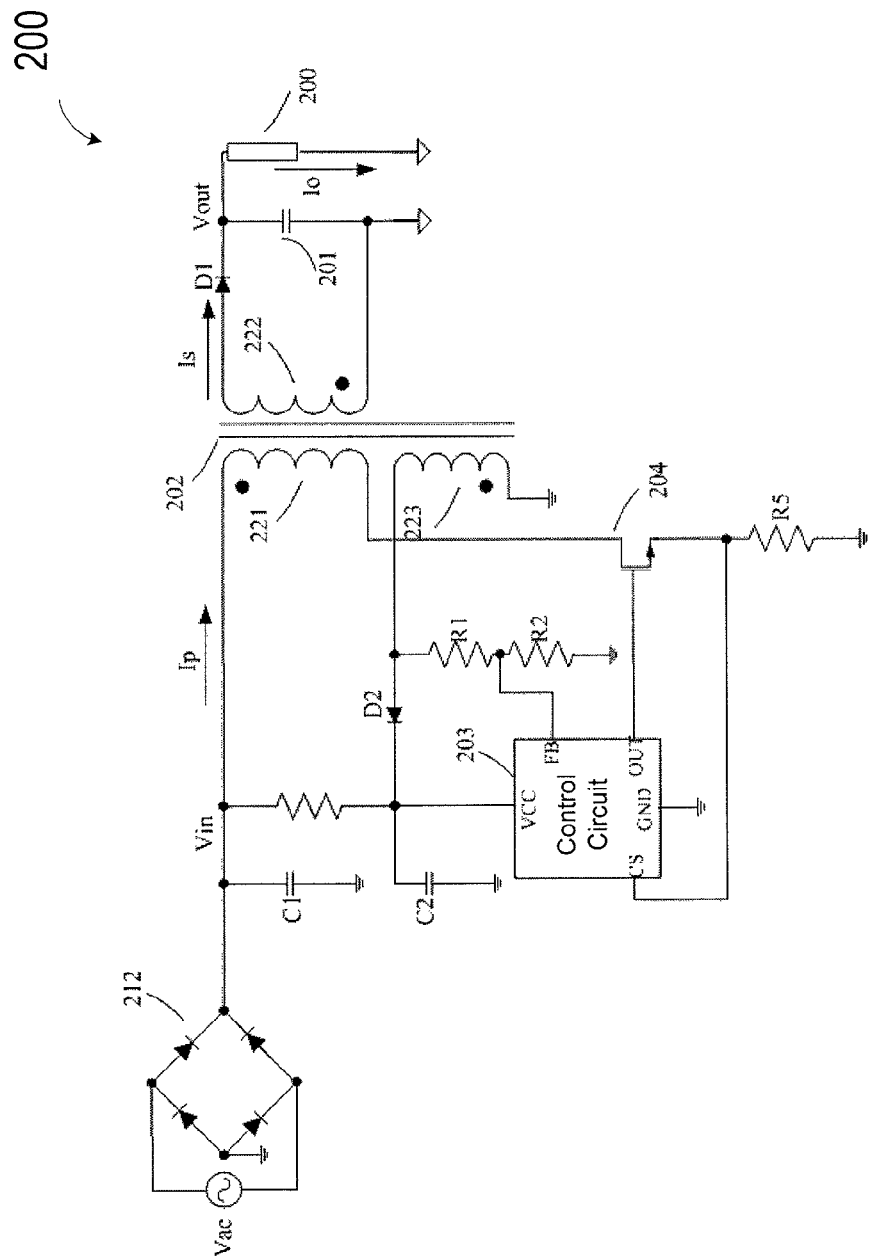
FIG. 2 is a simplified schematic diagram illustrating an SMPS according to an embodiment of the present invention.

FIG. 2 is a simplified schematic diagram illustrating an SMPS 200 according to an embodiment of the present invention. In FIG. 2, a rectifying bridge 212 is coupled to an AC voltage source Vac. An energy storage capacitor C1 is coupled to the rectifying bridge. One of the functions provided by capacitor C1 is to reduce electromagnetic interference. Also shown in FIG. 2 is a transformer 202, which includes a primary winding 221, a secondary winding 222, and an auxiliary winding 223. The dots associated with the windings designate the same polarity. SMPS 200 also includes a control circuit 203 having the following terminals: FB for receiving a secondary winding conduction feedback signal, CS for receiving a signal related to the primary current, OUT for providing a driving signal to power switch 204, VCC for connecting a power supply, and GND for connecting to an electrical ground. The FB terminal receives a signal reflecting the operating state of the secondary wining 222 and the output voltage through auxiliary winding 223 and voltage divider resistors R1 and R2. The CS terminal receives a signal from sampling, current sensing, resistor R5 about the primary current flow through power switch 204 and primary winding 221.

In FIG. 2, control circuit 203 receives information about current flow through power switch 204 from the CS terminal and information about secondary winding conduction operating state signal from the FB terminal. Control circuit 203 is configured to provide a control signal at the OUT terminal to control the on and off of power switch 204. The output at secondary winding 222 is rectified, e.g., by rectifying diode D1, and provides at the power supply output terminal an output current Io and an output voltage Vout. As shown in FIG. 2, control circuit 203 receives its operating power from auxiliary winding 223 through a rectifying diode D2 and a capacitor C2.

Figure 3B:
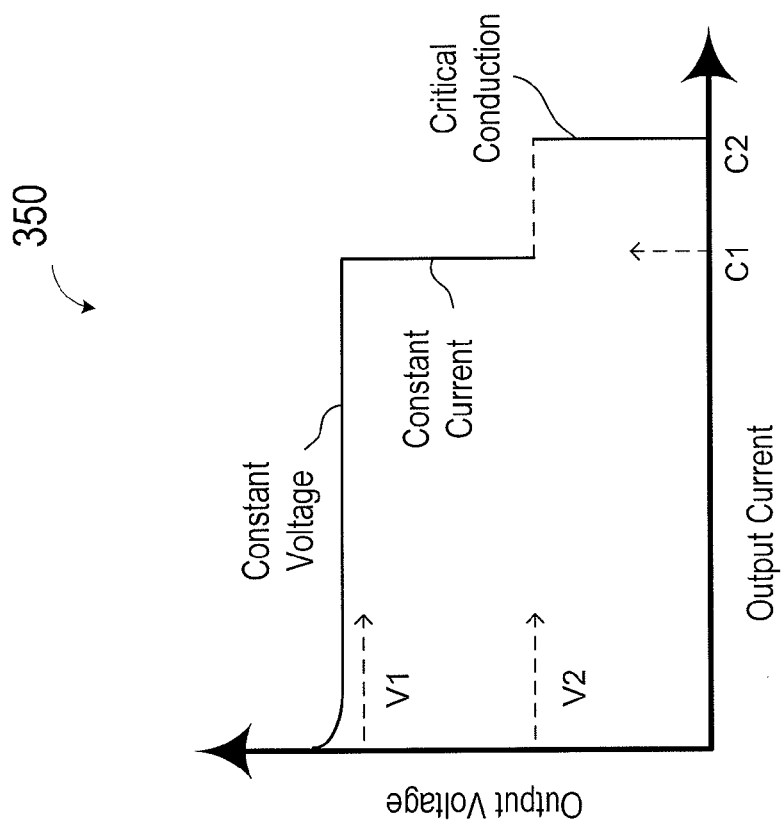
FIG. 3B is a plot illustrating a plot of output voltage versus output current for an SMPS having three modes of operation according to an embodiment of the present invention.
Figure 3A:
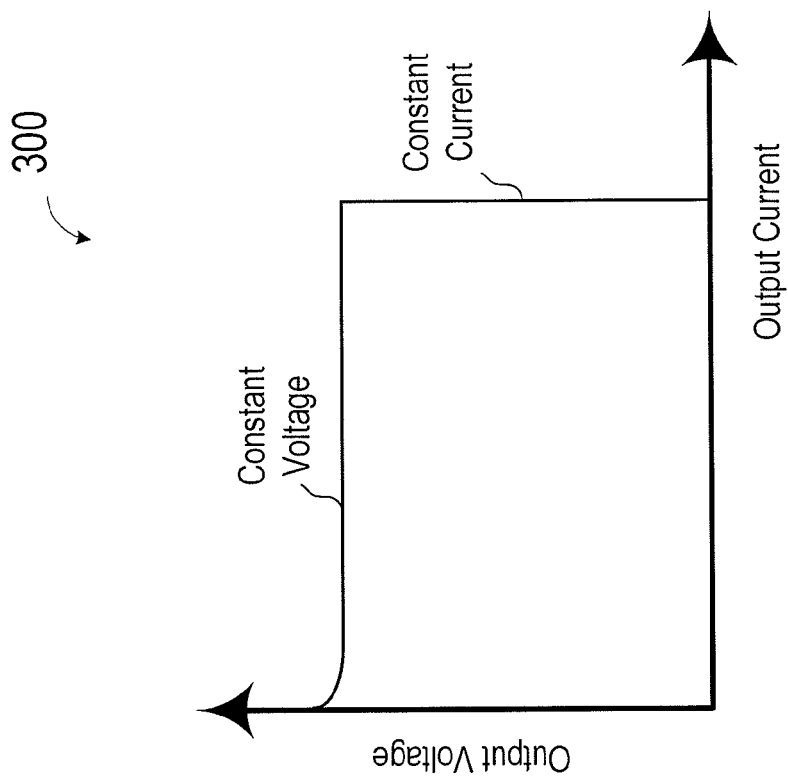
FIG. 3A is a plot illustrating a plot of output voltage versus output current for an SMPS having two modes of operation.

FIG. 3A is a plot illustrating a plot 300 of output voltage versus output current for an SMPS having two operating mode, and FIG. 3B is a plot 350 illustrating a plot of output voltage versus output current for an SMPS having three operating mode according to an embodiment of the present invention. As shown in FIG. 3a, an SMPS often operates in a constant-voltage mode or constant-current mode. In the constant-voltage mode, the SMPS controller is configured to maintain the output at a target voltage. The controller examines the output voltage through a feedback signal and, if the output falls below the target, turns on the power switch to supply more current. The power switch can be turned off when, for example, the primary current reaches a certain level or after a fixed duration. In the constant-current mode, the controller maintains a constant average output current. The constant-current mode is often used when the output load is low. However, in embodiments of the present invention, the conventional constant-current mode operation is found to be not satisfactory, for example, during the start up phase of the power supply. As can be seen in FIG. 3A, during start up, when the output voltage is close to zero, and the system is in a constant-current mode. As a result, the output current is fixed, which can lead to a long start up time. In contrast, FIG. 3B illustrates a desirable output voltage versus output current plot provided by embodiments of the invention, in which the SMPS can still operates in a constant-voltage mode and a constant-current mode, but also has an enhanced phase in which the start up or low output voltage operation is improved. In particular, at low output voltage, e.g., during start up, the output current is high, allowing a faster start up or a fast recovery from a low out put condition. In some embodiments, the third mode operation is referred to as critical conduction mode. An exemplary embodiment of an SMPS controller for implementing such output characteristic is described below.

Figure 4:
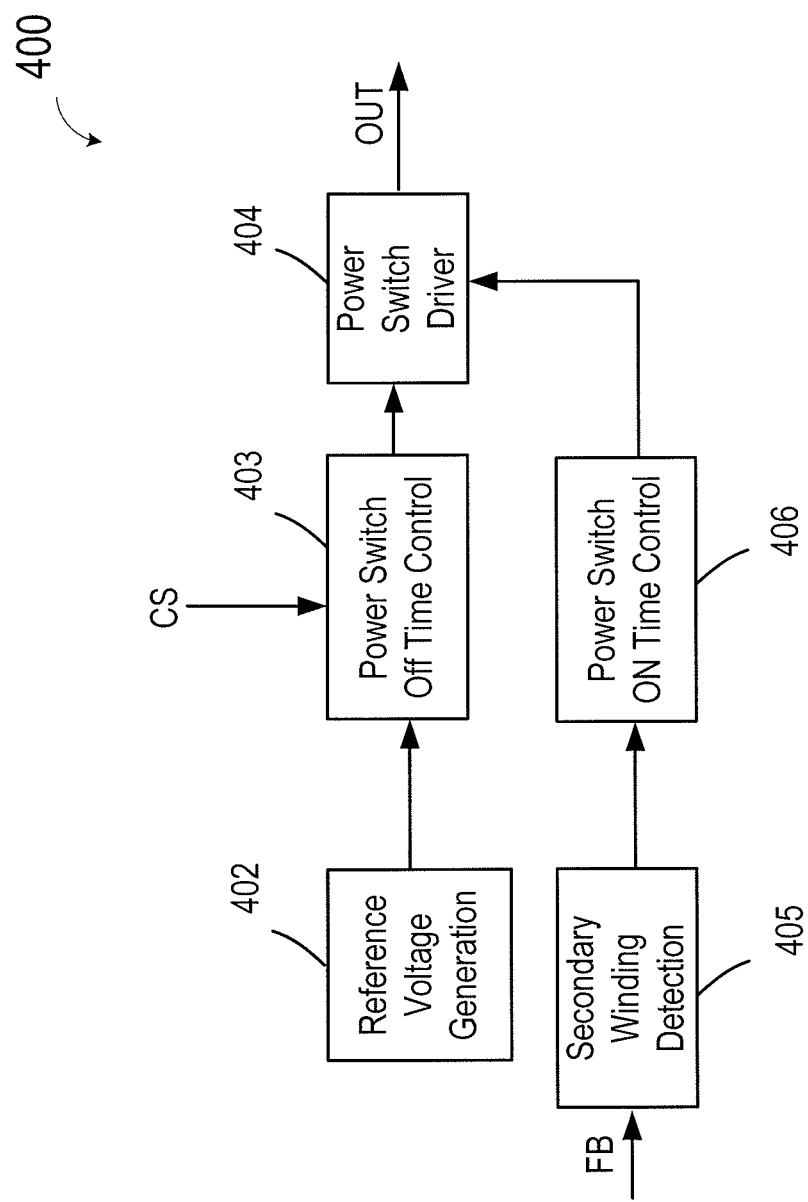
FIG. 4 is a simplified block diagram illustrating some of the functions of an SMPS controller according to an embodiment of the present invention.

FIG. 4 is a simplified block diagram illustrating some of the functions of an SMPS controller according to an embodiment of the present invention. As shown in FIG. 4, reference voltage generation circuit 402 is configured to provide a DC reference voltage, which is used to determine the peak current through the power switch. Power switch off time control circuit 403 is coupled to reference voltage generation circuit 402 and the input from the CS (current sense) terminal. When the voltage provided at the CS terminal reaches the above-mentioned reference voltage, the current in the primary winding is cut off. Secondary winding detection circuit 405 receives the feedback signal from the FB terminal to produce a voltage signal that reflects the current conduction in the secondary rectifying circuit. Power switch on time control circuit 406 determines the power switch on time based on charging a capacitor using a first current source and discharging the capacitor using a second current source. Power switch driver circuit 404 receives control signals from power switch off time control circuit 403 and power switch on time control circuit 406 and provides a control signal OUT to the power switch to turn it on and off. In constant-current mode, the ratio of the on time and off time is maintained at a constant.

Figure 5:
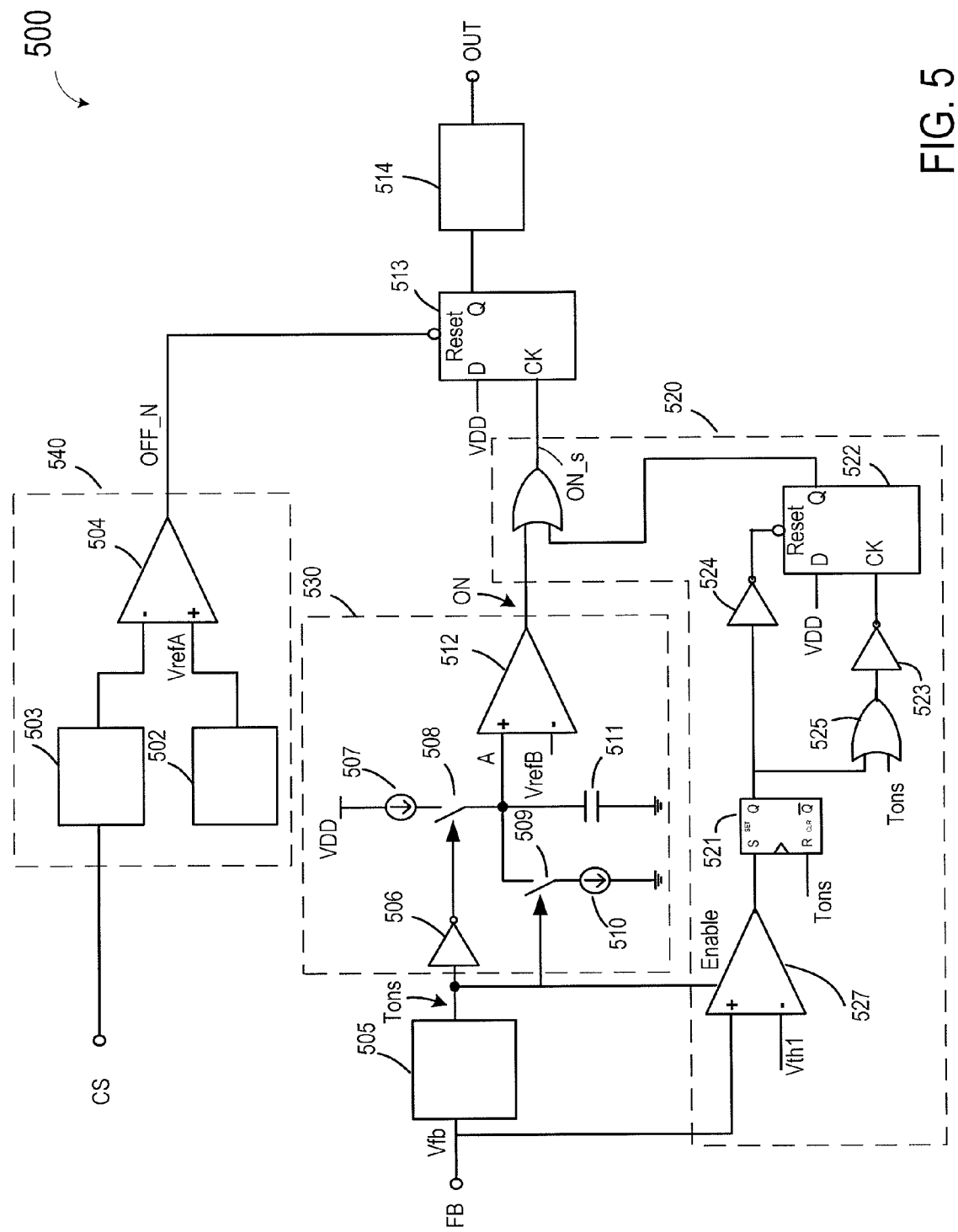
FIG. 5 is a schematic diagram illustrating an embodiment of control functions of an SMPS controller in constant-current mode.

FIG. 5 is a schematic diagram illustrating an embodiment of an SMPS controller according 500 to an embodiment of the present invention. These functions are described with reference to the waveforms of relevant signals illustrated in FIGS. 6 and 7. A secondary conduction detection circuit 505 receives feedback signal Vfb from the FB terminal and generates a secondary conduction time signal Tons that reflects the state of secondary rectifying circuit conduction. In some embodiment, Tons is at a high to indicate that a current is flowing in the secondary winding. In an embodiment, secondary conduction detection circuit 505 includes a demagnetization detector (not shown) that compares feedback signal Vfb with a reference voltage (e.g., 0.1V) to detect the demagnetization of the primary winding. The demagnetization detector is coupled to a Tons detector (not shown), which produces the secondary conduction time signal Tons. The logic high state of secondary conduction time signal Tons is indicative of the secondary current flowing through the secondary winding.

FIG. 5 also includes a constant-current control circuit 530 configured to receive the secondary conduction time signal Tons and to produce a constant current control signal (ON) that causes the power switch control signal OUT to be activated at fixed intervals. As shown in FIG. 5, when current flow is on in the secondary rectifying circuit, as represented by signal Tons, is at a high voltage level, and switch 509 is turned on. In the mean time, switch 508 is turned off by Tons through inverter 506. At this time, capacitor 511 is discharged by current source 510. Conversely, when current flow is off in the secondary rectifying circuit, signal Tons is at a low voltage level, and switch 509 is turned off. In the mean time, switch 508 is turned on by Tons through inverter 506. At this time, capacitor 511 is charged by current source 507.

By selecting an appropriate reference current VrefB, the voltage at capacitor 511 during charging and discharging follows a triangular waveform. The ratio of on time to off time of the secondary rectifying circuit is determined by a constant determined by current sources 507 and 510. When the capacitor charging curve crosses with reference voltage VrefB, the output of comparator 512, constant current control signal (ON), becomes high, causing the output Q of D-trigger 513 to be high, which in turn causes power switch 514 to output control signal OUT to turn on the power switch. The OUT signal will stay on until it is turned off by the off time control circuit 540 described below.

As shown in FIG. 5, D-trigger 513 receives an OFF_N signal and causes driver circuit 514 to deactivate the OUT signal for turning off the power switch. The OFF_N signal is produced by comparator 504 in off time control circuit 540 by comparing a reference signal VrefA from reference signal generator 502 and a signal from the CS terminal through leading edge blanking circuit 503. In other words, the power switch is turned off when the current flow in the primary winding through the power switch reaches a reference value. In one embodiment, leading edge blanking circuit (LEB) 503 includes a certain leading edge blanking time to block any spikes occurring at the sense resistor when the power switch is turned on.

Figure 6:
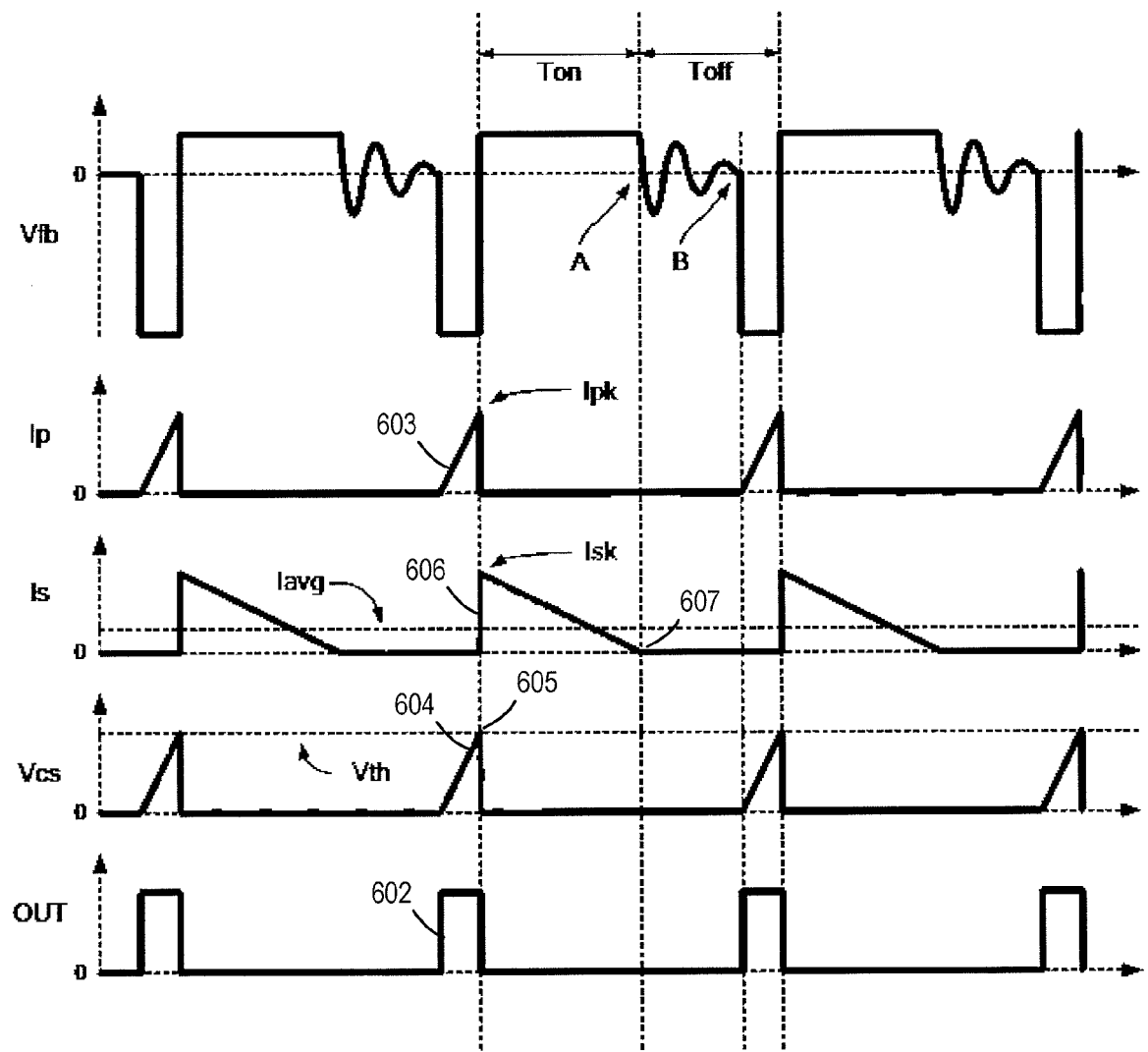
FIG. 6 illustrates the waveforms of signals in the control circuit of FIG. 5 without a critical conduction mode.

The operation of the control circuit is further illustrated by the waveforms in FIG. 6, which includes waveforms for the following signals.

Vfb is the voltage signal at the FB terminal and represents the secondary side conduction state;

Ip is the primary current, i.e., the current flowing in the primary winding;

Is is the secondary current, i.e., the current flowing in the secondary winding;

Vcs is the current sense voltage, which indicates the magnitude of primary current; and OUT is the control signal issued to the power switch from the SMPS controller.

In FIG. 6, when the OUT signal 602 is set to high and turns on the power switch, a current starts to build up in the primary winding, as indicated by the triangular waveform 603 of Vcs. The primary current is sensed by current sense voltage 604, which also shows a rising triangular waveform. When the Vcs signal 604 reaches threshold voltage Vth at 605, control signal OUT is turned off. At this point, primary current Ip reaches a peak current Ipk and then stops, and this current change induces a current in the secondary winding Is at 606, which starts at a peak current Isk and gradually decreases, finally reaching zero at 607. The Ton signal is high in the time interval during which secondary current Is flows. When secondary current Is reaches zero at 607, the Ton signal is also drops to zero at point "A" in FIG. 6 After a delay, at point "B," the OUT signal is turned high again to turn on the power switch and starts the next cycle. This delay is determined by constant-current control circuit 530 including capacitor 511 and current sources 507 and 510. The time interval during which secondary current is not flowing is marked as Toff in FIG. 6. In constant-current mode operation, the ratio of Ton to Toff is held constant, and so is the average secondary current is designated as Iavg in FIG. 6. The cycle described above is repeated.

As noted above, in FIG. 6, Tons is the time during which secondary Is flows, and Ioff is the time during which secondary current Is is zero. "A" and "B" designate two transition points of Vfb. In some embodiments, in constant-current mode, the ratio of Ton to Toff is fixed, i.e., a constant duty cycle. It can be seen that during a substantial part of Toff, secondary current Is is zero. This condition is sometimes referred to as discontinuous current mode, which may be acceptable during normal operations. However, during start-up, when the currents are being built up, this mode of operation can lead to prolonged start-up time. The long start-up time may be unsatisfactory in some applications. In order to remedy this limitation, embodiments of the invention also include a start up control circuit 520 as shown in FIG. 5.

In FIG. 5, critical conduction control circuit 520 is configured to trigger the power switch control signal to turn on the power switch on a falling edge of the secondary conduction time signal signal when the feedback signal is lower than a reference voltage. Critical conduction control circuit 520 includes a comparator 527, a flip-flop 521, a D-trigger 522, inverters 523 and 524, and an OR gate 525. Comparator 527 receives Tons as an enable signal and compares the FB signal with a threshold reference voltage Vth1. Tons is also connected to the reset terminal of flip-flop 521 and OR gate 525. In each on-off cycle, when the primary-side power switch is conducting, Tons is low, and the output of D-trigger 522 is low. When Tons is high, comparator 527 is enabled. If the voltage at FB does not reach threshold reference voltage Vth1, the output of D-trigger 522 is kept low. At the falling edge of the Tons signal, the output of D-trigger is raised to high, causing driver 514 to turn on the power switch. Here, when secondary current is lowered to zero at the trailing edge of Tons, the next on-cycle of the power switch is started.

Similarly, when Tons is on, if the voltage at FB is greater than threshold voltage Vth1, the output of comparator 527 is high, which triggers RS flip-flop 721, causing its output to be high. The high output of flip-flop 521 overrides the Tons signal with OR gate 525 and, through inverter 523, keeps the output of D-trigger 522 low. Under this condition, control of the power switch is determined by the output of comparator 512, as described above in the normal constant-current mode.

Figure 7:
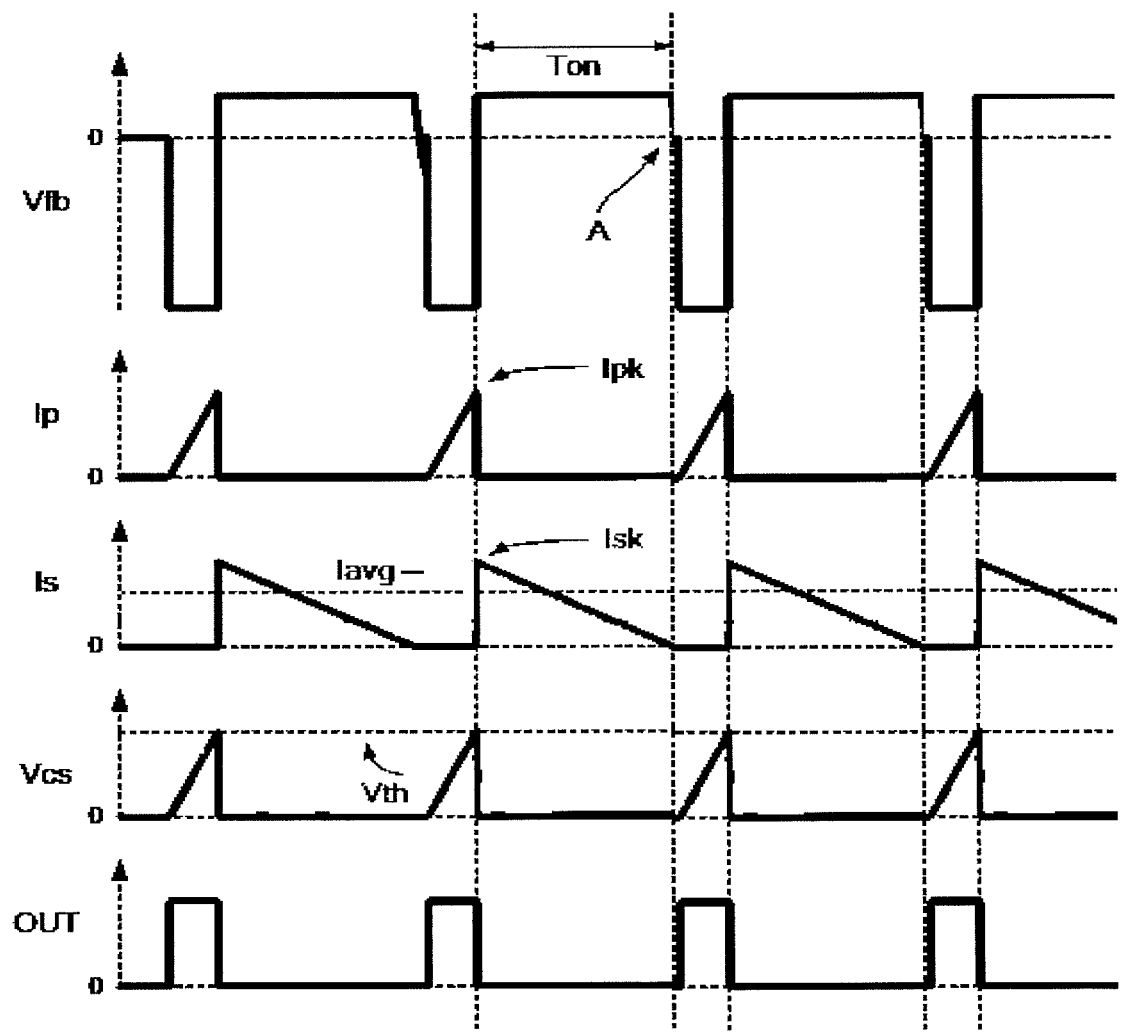
FIG. 7 illustrates the waveforms of signals in the control circuit of FIG. 5 including a critical conduction mode.

FIG. 7 illustrates the waveforms of signals in control circuit 500 of FIG. 5 including a critical conduction mode. The signals are the same as listed above in connection with FIG. 6. It can be seen that the power switch is turned on at the trailing edge of the Tons signal, as soon as the secondary current reduces to zero. In the Vfb waveform, the time period Ton, at point "A," is followed immediately by a negative pulse, which is triggered by the OUT signal and indicates that primary current Ip is flowing. In FIG. 6, the Toff period includes a dead time during which no current is flowing, which is sometimes designated as a discontinuous mode of operation. In FIG. 7, there is little or no dead time between secondary current flow and primary current flow, which is referred to as critical conduction current mode. In this mode of operation, the Toff period shown in FIG. 6 is substantially reduced. As a result, a higher output current can be obtained.

The operation depicted in FIGS. 5 and 7 and described above can be illustrate in FIG. 3B. It can be seen in FIG. 3B that when the output voltage is above a reference voltage V1, the system is in the constant-voltage mode in which the system is configured to maintain the output voltage at a target voltage. When the output voltage is below V1 but above a second reference voltage V2, the system is in the constant-current mode, in which the current on-off time ratio is maintained at a constant, and the output current is maintained substantially at current I1. When the output voltage is below V1, the system enters the critical conduction mode, in which the primary current flow closely follows the secondary current and dead time is minimized. In the critical conduction mode, the output current is at a current I2, which is higher than I1. Note that in the embodiment shown in FIG. 3B, in the critical conduction region, current I2 is shown to be a constant current I2. However, in other embodiments, the current in the critical conduction region may exhibit different current-voltage characteristics.

In the controller of FIG. 5, the transition between different modes of operation is carried out by comparing Vfb with properly selected reference voltages. As shown in FIG. 5, critical conduction mode is entered when Vfb=0 and Vfb<Vth1. When Vfb is higher than Vth1, the startup control circuit is not activated, and the constant-current mode operation takes over, in which a constant ratio of Ton to Toff is maintained. Similarly, the constant-voltage mode is activated when Vfb is greater than a second threshold voltage.

As an example, in a specific embodiments, the SMPS controller is in a constant-voltage mode, when Vfb is greater than, e.g., 4V. When Vfb is below 4V, the controller is in constant-current mode. To speed up the start up of the power supply, the controller can enter critical conduction mode when Vfb is less than, e.g., 1V. In this case, at Vfb>1V, the system is in discontinuous mode and can be either in constant-voltage mode or constant-current mode. In another example, the controller may have only two modes of operation, i.e., in constant-current mode when Vfb>1V and in critical conduction mode when Vfb<1V. Of course, there can be other variations.

Note that the description above in connection with FIGS. 4-7 focuses on constant-current mode operation. The constant-voltage mode of operation is similar to that of conventional SMPS, i.e., comparing Vfb with a target voltage and providing current to the output as needed. An example of constant-voltage mode operation is described in more detail in commonly owned U.S. patent application Ser. No. 12/620,420, filed Nov. 17, 2009, whose content is incorporated in its entirety by reference.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention.

What is claimed is:

1. A controller for a switched mode power supply (SMPS), wherein the SMPS includes a transformer having a primary winding coupled to a power switch and a secondary winding for providing an output of the power supply, the controller comprising:
   a first input terminal for receiving a current sensing signal, which is related to a current in the primary winding;
   a second input terminal for receiving a feedback signal related to a current in the secondary winding; and
   an output terminal for providing a power switch control signal to turn on and off the power switch;
   wherein:
       when the feedback signal is higher than a first reference voltage, the controller is configured to cause the SMPS to maintain a constant output current at a first current magnitude; and when the feedback signal is lower than the first reference voltage, the controller is configured to cause the SMPS to provide a second output current at a second current magnitude higher than the first current magnitude.

2. The controller of claim 1, wherein, when the feedback signal is higher than a second reference voltage that is higher than the first reference voltage, the controller is configured to cause the SMPS to maintain a constant output voltage.

3. The controller of claim 1, further comprising: a secondary conduction detection circuit configured to receive the feedback signal from the second input terminal and to generate a secondary conduction time signal, which is raised to a high value when a current is flowing in the secondary winding.

4. The controller of claim 3, further comprising a constant-current control circuit configured to receive the secondary conduction time signal and produce a constant current control signal that causes the power switch control signal to be activated at fixed intervals.

5. The controller of claim 4, wherein the constant-current control circuit comprises:
a first capacitor configured to be charged with a source current through a source current switch and discharged with a sink current through a sink current switch; and
a comparator coupled to the first capacitor and configured to produce the constant current control signal.

6. The controller of claim 3, further comprising a critical conduction control circuit that is configured to trigger the power switch control signal to turn on the power switch on a falling edge of the secondary conduction time signal when the feedback signal is lower than the first reference voltage.

7. The controller of claim 6, wherein the critical conduction control circuit comprises:
a comparator configured to receive the feedback signal and the first reference voltage, the comparator being enabled by the secondary conduction time signal;
a flip-flop coupled to the comparator; and
a D-trigger circuit coupled to the flip-flop through one or more logic gates.

8. The controller of claim 1, further comprising a constant-voltage control circuit that is configured to trigger the power switch control signal when the feedback signal falls below a target output voltage.

9. The controller of claim 1, further comprising an off time control circuit configured to deactivate the power switch control signal when the current sense signal reaches a preset value.

10. The controller of claim 1, wherein the controller is configured to cause the power supply to provide a maximum output current at start up.

11. A switched mode power supply (SMPS), comprising:
a primary winding;
a power switch coupled to the primary winding;
a secondary winding for providing an output of the power supply; and
a controller coupled to the power switch, the controller having:
a first input terminal for receiving a current sensing signal, which is related to a current in the primary winding;
a second input terminal for receiving a feedback signal related to a current in the secondary winding; and
an output terminal for providing a power switch control signal to turn on and off the power switch;
wherein:
when the feedback signal is higher than a first reference voltage, the controller is configured to cause the SMPS to maintain a constant current at a first current; and
when the feedback signal is lower than the first reference voltage, the controller is configured to cause the SMPS to provide a second current that is higher than the first current.

12. The controller power supply of claim 11, wherein, when the feedback signal is higher than a second reference voltage that is higher than the first reference voltage, the controller is configured to cause the SMPS to maintain a constant output voltage.

13. The controller of claim 11, further comprising a secondary conduction detection circuit configured to receive the feedback signal from the second input terminal and generate a secondary conduction time signal, which is raised to a high value when a current is flowing in the secondary winding.

14. The controller of claim 13, further comprising a constant-current control circuit configured to receive the secondary conduction time signal and produce a constant current control signal that causes the power switch control signal to be activated at fixed intervals.

15. The controller of claim 14, wherein the constant-current control circuit comprises:
a first capacitor configured to be charged with a source current through a source current switch and discharged with a sink current through a sink current switch; and
a comparator coupled to the first capacitor and configured to produce the constant current control signal.

16. The controller of claim 13, further comprising a critical conduction control circuit that is configured to trigger the power switch control signal to turn on the power switch on a falling edge of the secondary conduction time signal when the feedback signal is lower than the first reference voltage.

17. The controller of claim 16, wherein the critical conduction control circuit comprises:
a comparator configured to receive the feedback signal and the first reference voltage, the comparator being enabled by the secondary conduction time signal;
a flip-flop coupled to the comparator; and
a D-trigger circuit coupled to the flip-flop through one or more logic gates.

18. The controller of claim 11, further comprising a constant-voltage control circuit that is configured to trigger the power switch control signal when the feedback signal falls below a target output voltage.

19. The controller of claim 11, further comprising an off time control circuit configured to deactivate the power switch control signal when the current sense signal reaches a preset value.

20. The controller of claim 11, wherein the controller is configured to cause the power supply to provide a maximum output current at start up.

* * * * *